United States Patent [19]

Baker

[11] 4,455,596

[45] Jun. 19, 1984

[54] FLYBACK-FORWARD BOOST SWITCHMODE CONVERTER

[75] Inventor: George J. Baker, Brookville, Ohio

[73] Assignee: NCR Corporation, Dayton, Ohio

[21] Appl. No.: 387,997

[22] Filed: Jun. 14, 1982

[51] Int. Cl.³ ............................................ H02M 3/335
[52] U.S. Cl. ....................................... 363/21; 323/267
[58] Field of Search .................................... 363/18–21, 363/56, 97, 131; 323/222, 224, 267

[56] References Cited

U.S. PATENT DOCUMENTS

| 2,282,838 | 5/1942 | Whitmore | 171/119 |
| 3,391,322 | 7/1968 | Findley, Jr. et al. | 321/2 |
| 3,469,179 | 9/1969 | Bassett, Jr. | 323/45 |
| 4,209,826 | 6/1980 | Priegnitz | 363/21 |
| 4,215,392 | 7/1980 | Rhoads | 363/49 |
| 4,374,355 | 2/1983 | Steigerwald et al. | 363/21 X |

FOREIGN PATENT DOCUMENTS 56-86070  7/1981  Japan .................................... 363/21

OTHER PUBLICATIONS

M. Kohno and K. Kuwabara, "Single-Ended DC-DC Converter with Two Individually Controlled Outputs", Fujitsu Sci. & Tech. J. (Japan), vol. 16, No. 1 (Mar. 1980), pp. 23-37.

Contino, J. S., et al., "Flyback Switching Power Supplies with Individual Output Regulation", IBM Technical Disclosure Bulletin, vol. 22, No. 2, Jul. 1979, pp. 632-633.

*Primary Examiner*—Peter S. Wong
*Attorney, Agent, or Firm*—J. T. Cavender; Albert L. Sessler, Jr.; Elmer Wargo

[57] ABSTRACT

A high-frequency, power converter circuit including a transformer for transforming electrical current and having a primary; at least one secondary winding of a first type, and at least one secondary winding of a second type. The secondary windings of said first and second types are in flux-coupling relationship with the primary. A source of electric current is operatively coupled to the primary to flow therethrough. An electronic switch is used for periodically interrupting the flow of current through the primary to provide "on" and "off" periods therefor. A flyback circuit is operatively associated with the secondary winding of the first type to provide a first output from the power converter circuit. A secondary circuit includes a first diode and an inductor being series connected with the secondary winding of the second type, the diode being positioned in the secondary circuit to enable the inductor to store energy from the transformer during an on period. The flyback circuit also has a diode positioned therein to enable current to flow to the first output during an off period; and a second diode is coupled to the junction between the first diode and the inductor to enable current to flow from the inductor to an output of the secondary circuit during an off period.

4 Claims, 4 Drawing Figures

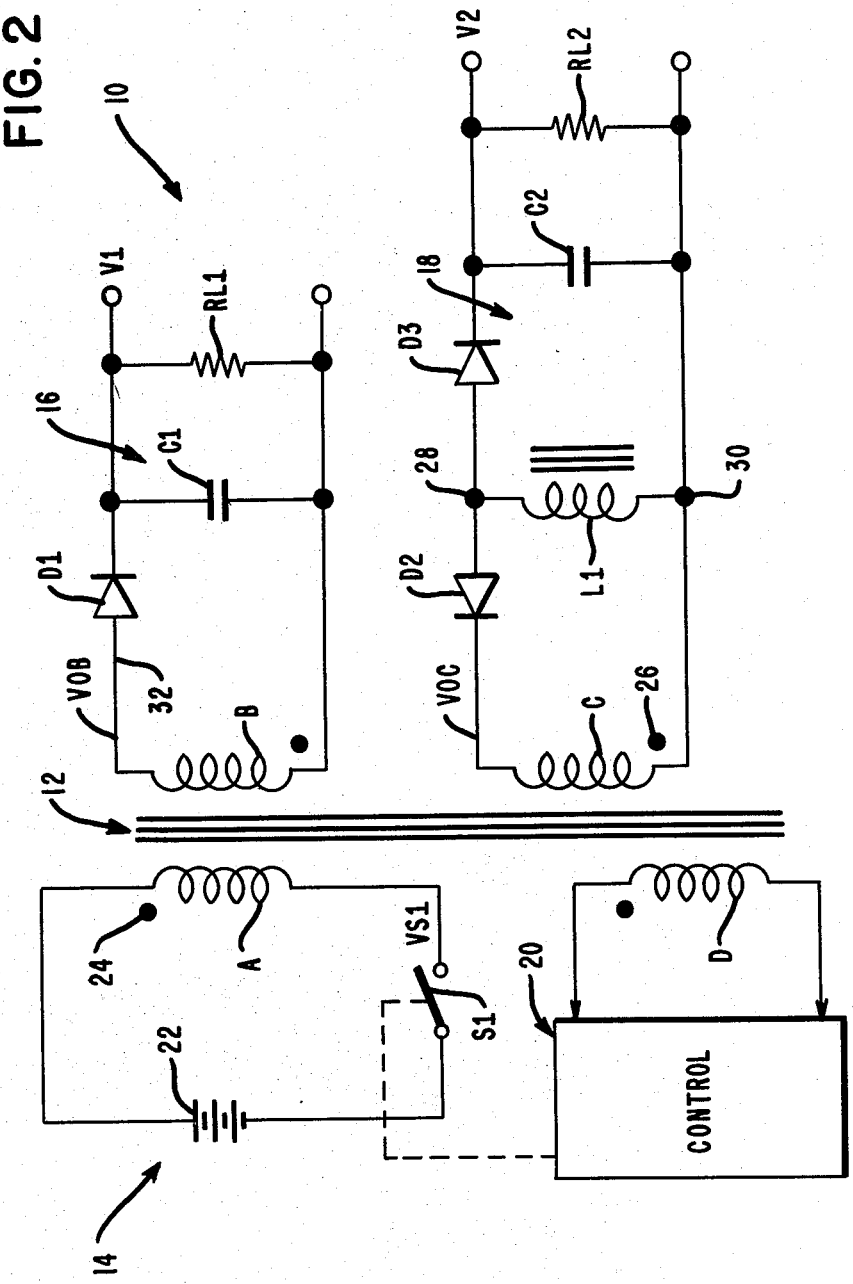

2

4,455,596

1

FLYBACK-FORWARD BOOST SWITCHMODE CONVERTER

BACKGROUND OF THE INVENTION

This invention relates to a power converter circuit, and more particularly, it relates to one of the high frequency types which utilizes flyback and buck boost outputs.

One of the problems with prior art, converter-type, power supplies is that in some situations, electrical items such as solenoids or printer elements drain excessive amounts of current compared to logic circuitry when such items are supplied with power from the same power supply. When such excessive drain occurs, the operation of the logic circuitry becomes affected adversely.

SUMMARY OF THE INVENTION

The power converter circuit of this invention avoids the problem mentioned in the previous paragraph in that excessive demands in one portion of the converter circuit do not adversely affect another portion of the converter circuit which provides power to logic circuitry.

One embodiment of this invention comprises means for transforming electrical current having a primary, at least one secondary winding of a first type, and at least one secondary winding of a second type, said secondary windings of said first and second types being in fluxcoupling relationship with said primary; a source of electric current operatively coupled to said primary to flow therethrough; means for periodically interrupting the flow of current through said primary to provide on and off periods therefor; a flyback circuit operatively associated with said secondary winding of said first type to provide a first output from said power converter circuit; a secondary circuit having an output and also having a first unidirectional device and means for storing energy being series connected with said secondary winding of said second type, said unidirectional device being positioned in said secondary circuit to enable said means for storing to store energy from said transforming means during a said on period; said flyback circuit having a unidirectional device positioned therein to enable current to flow to said first output during a said off period; and a second unidirectional device being coupled to said junction between said first unidirectional device and said means for storing energy to enable current to flow to said output of said secondary circuit during a said off period.

Some of the additional advantages of this invention are as follows:

1. Two converters, with one, for example, being used for high or varied current demand items and the other being used for stable demand items, can be operated from a common switch and transformer;

2. Both converters in the example described have DC isolation between inputs and outputs;

3. One control circuit and feedback sense winding controls both converters from a regulation standpoint; and 4. Bilateral energy transfer is provided.

These advantages and others will be more readily understood in connection with the following description, claims and drawing.

BRIEF DESCRIPTION OF THE DRAWING

FIG. 2 is a schematic diagram showing more details of the converter circuit shown in FIG. 1;

DETAILED DESCRIPTION OF THE INVENTION

Figure 1:
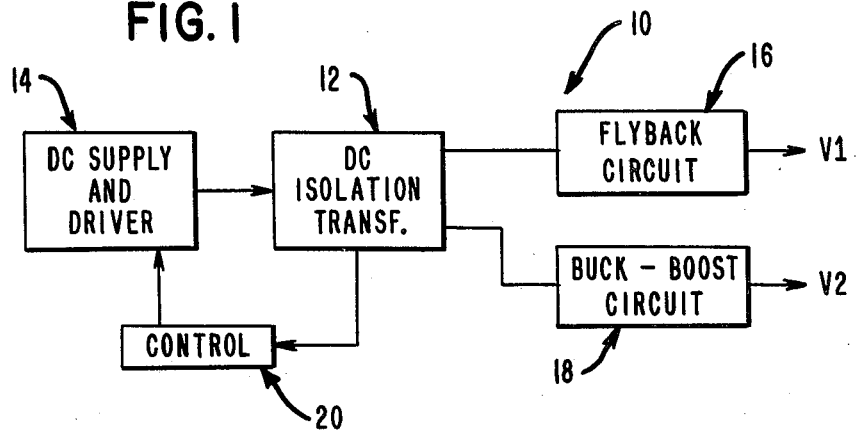
FIG. 1 is a general schematic diagram, in block form, showing the switchmode converter circuit of this invention.

FIG. 1 is a general schematic diagram, in block form, showing the switchmode converter circuit of this invention which is designated generally as circuit 10.

The circuit 10 includes a DC isolation transformer 12 which is coupled to a DC supply and driver circuit 14 which supplies the primary of the transformer 12 with a chopped or modulated DC current as will be described hereinafter. The transformer 12 is coupled to a flyback circuit 16 whose output is a regulated DC voltage V1, and the transformer 12 is also coupled to a buck-boost-type circuit 18 whose output is a regulated DC voltage V2. A control circuit 20 is operatively coupled between the transformer 12 and the driver circuit 14 to control the duration of the "on time" of the energizing current to the transformer 12 by which the outputs of the converter circuit 10 are varied or regulated.

Figure 3:
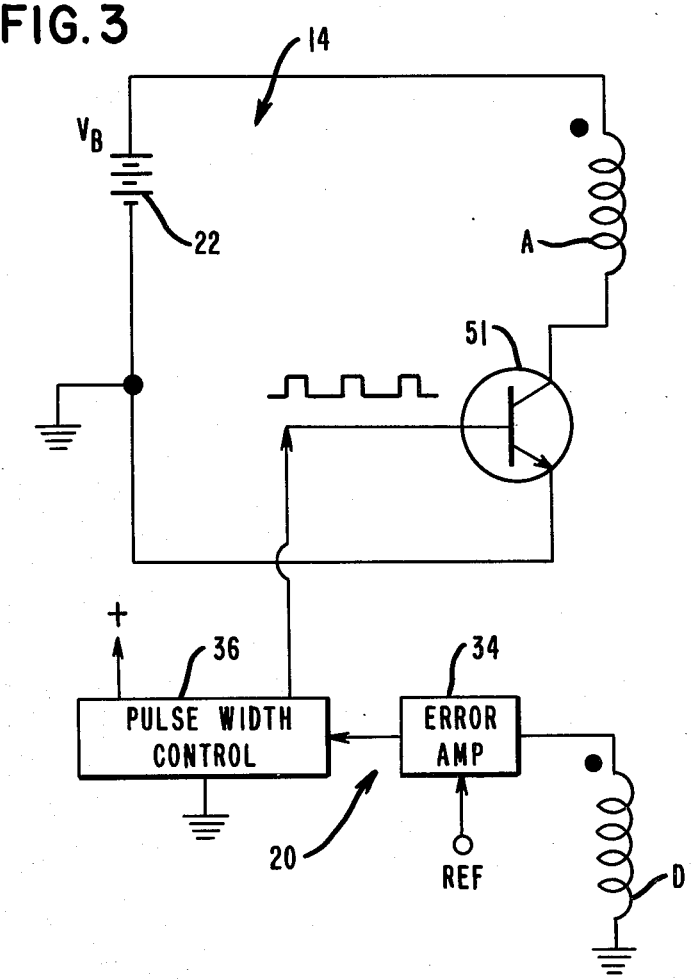
FIG. 3 is a schematic diagram showing additional details of the control shown in FIG. 2.

FIG. 2 shows more details of the converter circuit 10 shown in FIG. 1. The driver circuit 14 includes a battery 22 having a potential VB and also having its positive terminal connected to one end of the primary winding A of the transformer 12. The remaining end of the primary winding A is connected through a switching arrangement (shown schematically as a switch S1) to the negative terminal of battery 22. During normal operation in the embodiment described, the switch S1 remains alternately closed for about 10 microseconds and opened for about 40 microseconds. The alternate closing and opening of the switch S1 provides the necessary "chopping" or changing of flux fields in the primary to induce EMF in the windings B, C, and D as will be described hereinafter. Switch S1 is shown as a mechanical switch in FIG. 2 simply to facilitate an understanding of the converter circuit 10; however, switch S1 is actually an electronic switch as shown in FIG. 3. This aspect will be discussed in detail hereinafter.

The switch S1 (FIG. 2) is under the control of the control circuit 20 which modulates or varies the "on" time of the switch in response to the output from the winding D of transformer 12. Winding D is utilized to provide feedback from the output of circuit 16, for example, to enable the outputs of the converter circuit 10 to be regulated; this aspect will be described later herein with reference to FIG. 3.

When switch S1 (FIG. 2) is closed, current from the battery 22 flows through the primary winding A. The dots like 24, associated with a winding like A, for example, are used to show the positive side of the associated winding.

When the current flows through the winding A upon the closing of switch S1, no current flows through the secondary winding B, which is a winding of a first type; this is due to a unidirectional device such as a diode D1 being reverse biased. The energy which was driven into the primary winding A is stored within the air gap within the transformer 12 itself. Diode D1 is series connected with the secondary winding B, and its cathode is connected to the output V1 of the circuit 10. A conventional storage capacitor C1 and a load resistor RL1 are connected between the cathode of diode D1 and the system ground as shown. Only one secondary winding like B is shown in order to simplify the drawing; however, it is apparent that additional windings may be employed. Naturally, the additional windings (not shown) may have the appropriate turns ratios (with reference to the primary winding A) to provide the necessary output voltages like V1.

While no current flows through the secondary winding B (FIG. 2) when switch S1 is closed, current does flow through the secondary winding C of circuit 18 at the time that switch S1 is closed. At this time, the end of winding C, shown by dot 26, is positive. The circuit 18 also includes a storage device such as an inductor L1 which is joined to a unidirectional device such as a diode D2 at junction 28. The inductor L1 and the diode D2 are connected in series with the winding C, and when the end of winding C at dot 26 is positive, the diode D2 is forward biased, enabling current to flow through the inductor L1, storing energy therein.

The circuit 18 (FIG. 2) also includes a unidirectional device such as a diode D3 whose anode is connected to junction 28 and whose cathode is connected to the output V2 of the circuit 18. A conventional storage capacitor C2 and a load resistor RL2 are connected between the cathode of diode D3 and system ground as shown. At the time when energy is being stored in the inductor L1, due to the diode D2 being forward biased, no current flows through diode D3 because at this time, diode D3 is reverse-biased, the junction 30 being at a higher potential than junction 28.

Note that when the switch S1 is closed, energy is stored in two places in the circuit 10 (FIG. 2). Energy is stored in the air gap of transformer 12 with regard to winding B, and energy is stored in inductor L1 with regard to winding C.

When the switch S1 (FIG. 2) is opened, the polarity of each of the windings B and C changes. With regard to winding B, the end 32 becomes positive, enabling the energy stored in the air gap of the transformer 12 to flow through the winding B and the now, forward-biased diode D1 to charge the storage capacitor C1. With regard to winding C, junction 30 becomes more negative than junction 28 causing diode D3 to become forward biased; this enables the energy which was stored in the inductor L1 to charge the storage capacitor C2.

Notice that in normal operation when the switch S1 (FIG. 2) is opened, capacitor C1 is charged by the energy stored in the air gap in transformer 12, and capacitor C2 is charged by the energy stored in inductor L1. In the embodiment described, the output V1 (associated with circuits like 16) is used to power logic circuits (not shown) which require a very stable or regulated potential. In contrast, the output V2 may be used for supplying current to devices which draw high surges of current, devices such as solenoids and printers. Because the output V2 is derived from the inductor L1, the surge energy required by the solenoids mentioned is "isolated" from the demands for the logic circuitry mentioned as being associated with the output V1.

In the embodiment described, the switch S1 (FIG. 2) is opened and closed at a frequency of 20 K cycles per second. The usual "on" time for switch S1 is 10 microseconds followed by an off time of 40 microseconds. Generally, the one time can vary between 10 to about 12 microseconds due to changes in the load on the circuit 10. If there is no demand on the circuit 10, and the on time for switch S1 drops below 10 microseconds in the embodiment described, the outputs V1 and V2 of the circuit 10 are operated in what is referred to as a discontinuous mode of operation.

The on time of switch S1 (FIG. 1) is varied by the control 20 which is shown in more detail in FIG. 3. In the embodiment described, the outputs V1 and V2 of the circuit 10 are regulated by monitoring the demands on output V1. The control 20 has associated therewith a control winding D which is associatively coupled to winding B.

If, for example, the regulated output V1 is 5.0 volts and the output at V1 drops to about 4 volts due to excessive demand, then during the next time that current flows through the winding B, the drop in voltage therein will be sensed by the control winding D. The control winding D is coupled conventionally to an error amplifier 34 (FIG. 3) to which is fed a reference signal or voltage (REF). The output or difference signal from the error amplifier 34 is fed into a conventional pulse width control 36 which uses the difference signal to modulate the "on" time of the switch S1. In other words, when the voltage drops in the sense winding D, indicating higher demand at the output V1, the difference signal which is produced causes the pulse width control 36 to increase, conventionally, the "on" time of the switch S1.

In the embodiment described, the switch S1 (FIG. 3) is shown as an electronic switch such as an NPN transistor, for example, having its collector connected to one end of the winding A and its emitter connected to system ground. The modulated output from the pulse width control 36 is fed into the base of the transistor switch S1, causing the current from battery 22 to alternately flow through the primary winding A and be cut off therefrom at the frequency of 20K cycles per second as mentioned.

Figure 4:
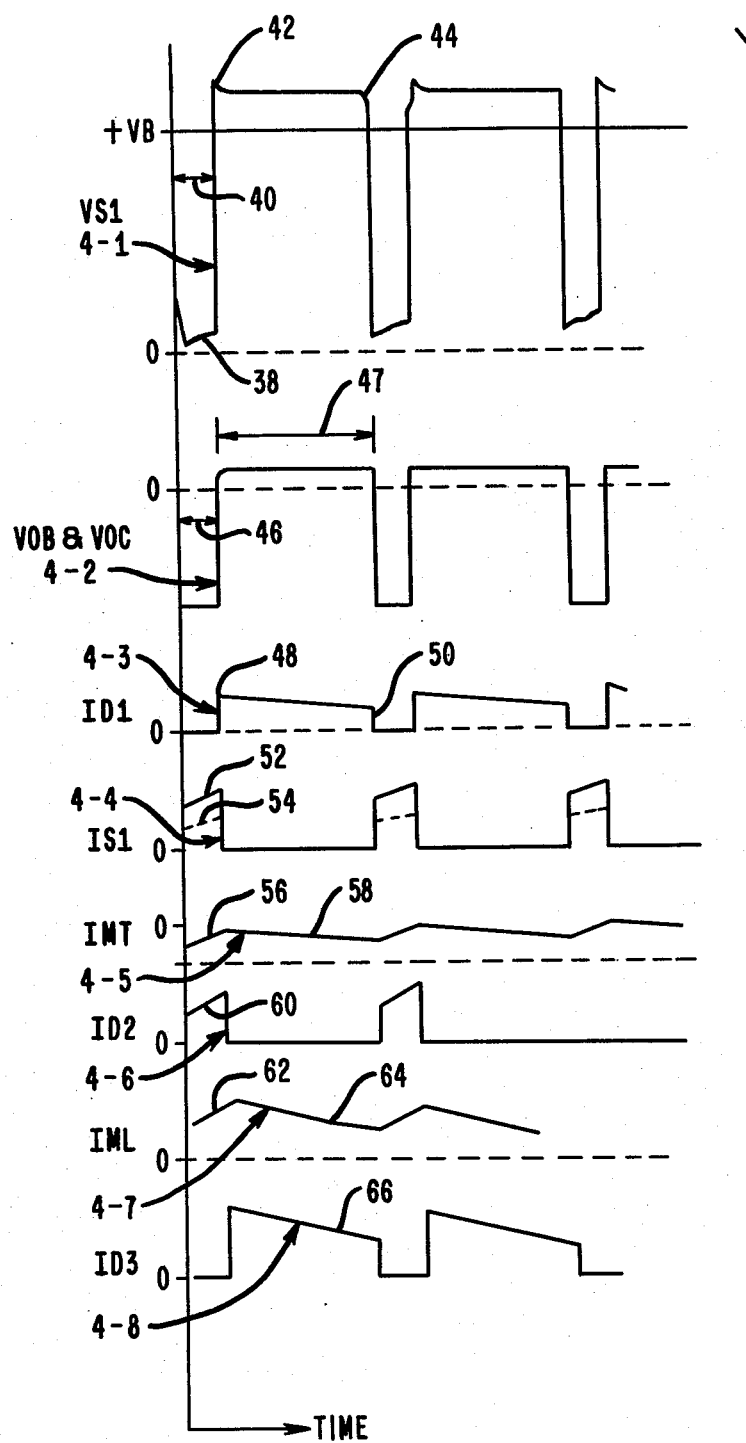
FIG. 4 shows a collection of waveforms associated with the circuit shown in FIG. 2.

FIG. 4 shows some waveforms associated with the circuit 10 shown in FIG. 2, with each of the waveforms shown therein being plotted with respect to time.

Waveform 4-1 (FIG. 4) shows the voltage appearing across the switch S1. When the transistor switch S1 (FIG. 3) is initially closed, the voltage across it drops from the voltage VB of the battery 22 towards zero. There is a slight voltage drop across the collector-emitter junction of the transistor switch S1 which prevents the voltage across the switch S1 from going to zero; this voltage drop is shown by line 38. The dimension line 40 represents the time when switch S1 is closed. When the transistor switch S1 is opened, the voltage thereacross rises above VB as shown at point 42. This incremental voltage increase above VB represents the induced voltage in winding B (from winding B) when switch S1 is opened; the incremental voltage above VB is dependent upon the turns ratio between windings B and A. At point 44, the transistor switch S1 is again closed, and the voltage thereacross drops toward zero to repeat the process. The time between points 42 and 44 on waveform 4-1 represents the time when switch S1 is open.

The waveform 4-2 (FIG. 4) represents the general waveshape for the voltages associated with the windings B and C as shown at points VOB and VOC, respectively, in FIG. 2. The magnitude of these voltages is dependent upon the turns of the windings B and C with regard to winding A. The polarity of voltages VOB and VOC is opposite to that of winding A when switch S1 is closed. Dimension line 46 represents the time when switch S1 is closed, and dimension line 47 represents the time when switch S1 is open.

The waveform 4-3 (FIG. 4) represents the flow of current ID1 through the diode D1. Line 48 represents the line at which current starts to flow (through the diode D1) when the switch S1 is opened and the flow of current stops at line 50 when the switch S1 is closed again.

The waveform 4-4 (FIG. 4) represents the current through the transformer T1 (as shown by line 52) when the switch S1 is closed, and similarly, the dashed line 54 represents the current through the inductor L1 when the switch S1 is closed.

The waveform 4-5 (FIG. 4) represents the magnetization (IMT) of transformer T1. The magnetization increases as at line 56 when switch S1 is closed, and it decreases as at line 58 when switch S1 is opened.

The waveform 4-6 (FIG. 4) represents the current (ID2) through the diode D2 with line 60 showing the current increasing through the diode D2 when the switch S1 is closed.

The waveform 4-7 (FIG. 4) represents the current (IML) passing through the inductor L1. Line 62 shows the current increasing when the switch S1 is closed, and line 64 shows the current passing through the diode D3 to the output V2 when the switch S1 is opened.

The waveform 4-8 (FIG. 4) represents the current (ID3) passing through the diode D3. Line 66 represents the current which flows through the diode D3 from the inductor L1 during the time that the switch S1 is off.

In one embodiment of the circuit 10, the transformer windings had the following number of turns: 80 of A; 15 for B; 34 for C; and 15 for D. The transformer T1 is wound by conventional winding techniques; however, in winding it, the control feedback winding D (FIG. 2) was placed close to winding B so as to obtain maximum regulation on the output V1.

I claim:

1. A high frequency power converter circuit comprising:

means for transforming electrical current having a primary, at least one secondary winding of a first type, and at least one secondary winding of a second type, said secondary windings of said first and second types being in flux-coupling relationship with said primary;

a source of electric current operatively coupled to said primary to flow therethrough;

means for periodically interrupting the flow of current through said primary to provide on and off periods therefor;

a flyback circuit operatively associated with said secondary winding of said first type to provide a first output from said power converter circuit;

a secondary circuit having an output separate from said first output and also having a first unidirectional device and means for storing energy being series connected with said secondary winding of said second type, said unidirectional device being positioned in said secondary circuit to enable said means for storing energy to store energy from said transforming means only during a said on period; said secondary circuit having a junction between said unidirectional device and said means for storing energy;

said flyback circuit having a unidirectional device positioned therein to enable current to flow to said first output only during a said off period; and a second unidirectional device being coupled to said junction between said first unidirectional device and said means for storing energy to enable current to flow to said output of said secondary circuit only during a said off period.

2. The power converter circuit as claimed in claim 1 in which said means for storing energy is an inductor.

3. The power converter circuit as claimed in claim 2 in which said means for periodically interrupting said flow of current includes an electronic switch to provide said on and off periods.

4. The power converter circuit as claimed in claim 3 in which said means for transforming electrical current includes a sense winding which is operatively coupled to said secondary winding of said first type; and in which said means for periodically interrupting includes a means for modulating said on periods of said electronic switch in accordance with a sensing signal derived from said sense winding; said first and second unidirectional devices of said secondary circuit, and said unidirectional device of said flyback circuit being diodes.

* * * * *